W. M. BRINKERHOFF.

PICTURE HOOK OR HANGER.

No. 10,862. Reissued Aug. 30, 1887.

Witnesses:

E. J. Walker

D. C. Reinohl

Inventor

Warren M. Brinkerhoff

By his attys.

Whittaker & Prevost

UNITED STATES PATENT OFFICE.

WARREN M. BRINKERHOFF, OF AUBURN, NEW YORK.

PICTURE HOOK OR HANGER.

SPECIFICATION forming part of Reissued Letters Patent No. 10,862, dated August 30, 1887.

Original No. 366,812, dated July 19, 1887. Application for reissue filed August 11, 1887. Serial No. 246,743.

*To all whom it may concern:*

Be it known that I, WARREN M. BRINKERHOFF, of Auburn, in the county of Cayuga and State of New York, have invented certain new and useful Improvements in Picture Hooks or Hangers; and I do hereby declare the following to be a full, clear, and exact description of the invention, that will enable others skilled in the art to which it appertains to make and use the same.

My invention relates to the class of devices known as "picture-hangers;" and it consists in certain peculiarities of construction whereby the picture supporting cord or wire is held from slipping upon its support and the accidental displacement of the picture prevented.

It is a fact well known to housekeepers that pictures in a dwelling-house are constantly getting awry upon the walls or out of true perpendicular. There being nothing to prevent the cord or wire from slipping upon its supports, any inconsiderate handling in dusting the room causes the cords to move upon the nails or hooks, resulting in a displacement of the pictures. In case the pictures are not balanced upon their supporting hooks or nails any sudden jar or vibration of the walls will also cause a slipping of the cord or wire on its support with like results.

My improved hanger is designed to avoid this difficulty, and to provide a support for a picture cord or wire which will not permit such cord to slip upon the same, and which will therefore tend to keep the pictures in place upon the walls.

In the accompanying drawings I have illustrated several modes in which I have contemplated applying my invention, and such invention is fully disclosed in the following specification and claims.

Figure 5:
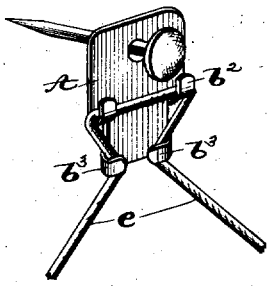
Figure 6:
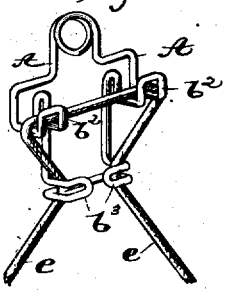

In the drawings, Figures 1, 2, 3, 4, and 7 are perspective views of different forms of a picture-hanger for attachment to a cornice. Fig. 5 is a view of a form of hanger which can be attached to the wall by a nail or screw. Fig. 6 is a like view of a hook formed entirely of wire.

The hanger consists of a main body, A, of any suitable material, and when designed for attachment to a cornice it is provided at its upper end with the large cornice-hook *a*. The cord or wire supporting hook is located beneath the hook *a*, and below this I form one or two hooks or projections, and the cord is made to engage these in the manner shown or any equivalent way. The cord is held by this means at such an angle, either in respect to the cord or wire hook or to such hooks themselves, that it is prevented from at all slipping upon its support. Even if one of the depending portions of the cord should give way while the weight of the picture is upon the cord and support, the picture is restrained from falling to the floor or to a greater distance than to throw the whole weight upon the remaining portion of the cord.

Figure 1:
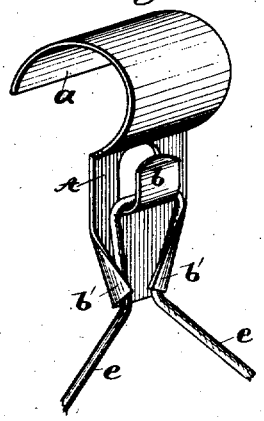
Figure 3:
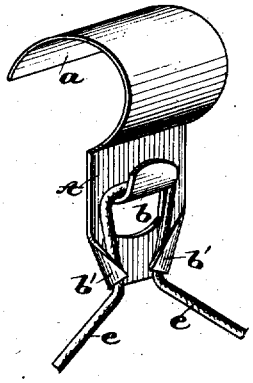

In all the figures except Fig. 6 the picture-hanger is shown made from a piece of plate metal, and in Figs. 1 and 3 the cord-hook *b* is shown as made by a tongue of metal cut from the central part of the plate and bent outward and then upward to form the hook. Below this hook the lower corners of the plate are bent to form the hooks $b'$ $b'$, which I denominate the "retaining-hooks."

In hanging a picture the cord or wire *c* is first placed upon the hook *b* and the picture adjusted to the proper position. The cord or wire is then grasped and placed in engagement with the retaining construction by inwardly deflecting the same, in which position it will be held against accidental displacement.

It will be seen that when the picture is suspended upon the cord or picture-support and its whole weight hanging thereon, the picture can be adjusted to its desired position with little difficulty, as there is nothing to prevent the cord from moving easily upon its support; but when the cord is placed within or in engagement with the retaining devices it is locked thereby and securely held in position.

Figure 2:
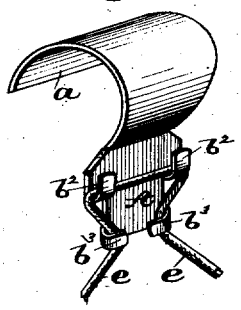
Figure 7:
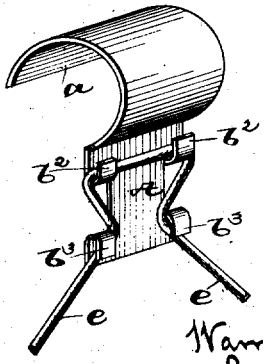

In Fig. 2 the cord or wire support is formed of two hooks, $b^2$ $b^2$, also integral with the plate, consisting of two pieces cut from the sides of the plate and turned upward. The retaining-hooks $b^3$ $b^3$ are formed of like portions of the plate turned from the sides toward the center of the plate; or the retaining-hooks may be cut from the sides in a similar manner to the cord-supporting hooks and turned downward, as shown in Fig. 7.

Figure 4:
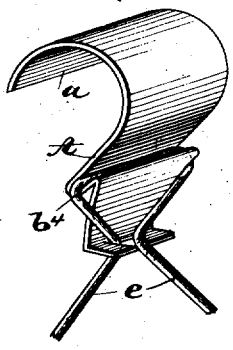

In Fig. 4 the main body of the plate is bent or folded transversely, so as to form a hook or support, $b^4$, for the cord, and the retaining-hooks are formed by providing the lower end of the plate with a dovetail slot and bending such lower portion of the plate outward at right angles with the main body of the hook or hanger.

In Fig. 5 I show the same form of cord and retaining-hooks as in Fig. 2. The plate A in this instance is not provided with the cornice-hook, but has near its upper end an opening to engage a nail or screw by which it is held in position on the wall. A like form of hook is shown in Fig. 6, made from wire instead of a plate.

Instead of the opening in the hook or hanger to receive a screw or nail, I may attach a spur, nail, or screw to the rear side of the upper part of the plate, and secure the hook to the wall therewith; but when designed for attachment to a plain surface the ordinary picture-nail or similar means of engagement may be used. In such cases it is not necessary that any support for the cord be provided other than the nail or similar devices. The depending portion below the nail may simply consist of a body of any suitable material provided with means for engaging its support and with the herein-described constructions for confining the cord or wire below the cord-support.

It will be understood that either of the forms shown may have a cornice-hook, or it may be attached to the wall, as hereinbefore indicated, or in any other preferred manner. The position of the retaining-hooks may be considerably varied; but they should be so located as to cause the cord or wire to be deflected considerably from its usual straight line from the cord-support to the picture-frame. I prefer to place them in a vertical line below the outer edges of the cord-support or within these positions and nearer the center of the hook, in either of which positions the cord, previous to its being secured by the retaining devices, will not ordinarily come in contact with the operative surfaces of the same.

It will also be observed that in the instances in which the cornice-hook is used the extended bearing of the same upon the cornice tends to prevent the vibration of the hook or hanger, and also that the locking of the cord to the hook or hanger at another point, giving the cord two bearings in different horizontal planes upon the hook, has a strong tendency to prevent the lateral vibration of the picture when once secured in position. This feature of my invention I regard as an important one, as it constitutes an almost sure safeguard against the accidental displacement of the picture.

I may sometimes employ but a single retaining-hook, as I have found that when placed in the positions shown in the drawings a single retaining-hook will prevent the slipping of the cord, as the bend of the cord inward beneath the cord-support will prevent its slipping in one direction, and the outward bend of the cord below the retaining-hook will prevent its moving in the opposite direction.

What I claim, and desire to secure by Letters Patent, is—

1. A picture-hanger consisting of a picture-cord support and a retaining device or devices below the cord-support for holding the cord in an inwardly-deflected position, the construction and arrangement of parts being such that the picture can be suspended upon the cord-support and while so suspended adjusted to its proper position and the cord then be removably secured by the retaining device or devices by inwardly deflecting and engaging the same therewith, as and for the purpose set forth.

2. The herein-described picture-hanger, consisting of a main body provided with means for engaging a support for the same, a cord-support, and a projection or projections for holding the cord in an inwardly-deflected position and from slipping on its support, said projection or projections being concaved or inclined between the outer end and the main body, forming notches or recesses parallel with the main body for receiving the cord, whereby the picture can be suspended upon the cord-support and while so suspended adjusted to its proper position without the cord's bearing on the operative surfaces of said projection or projections and the cord then removably engaged with said projection or projections, as and for the purposes set forth.

3. The herein-described picture-hanger, consisting of a plate provided with means for engaging a support for the same, a cord-support, and a projection or projections separate from the cord-support for holding the cord in an inwardly-deflected position and from slipping on its support, said projection or projections being concaved or reduced laterally, forming notches or recesses parallel with the main body of the hanger for receiving the cord, whereby the picture can be suspended upon the cord-support, and while the weight is upon the cord and its support the picture can be adjusted to its proper position and the cord removably secured by the projection or projections by inwardly deflecting and engaging the same therewith, as and for the purposes set forth.

4. The herein-described picture-hanger, consisting of a plate provided with means for engaging a support for the same, two cord-supports, and two hooks below and separate from the cord-supports for removably engaging both of the descending portions of the picture-cord, for the purposes specified.

5. The herein-described picture-hanger, consisting of a main body provided with means for engaging a support for the same, a cord-support the lateral edges of which extend nearly or quite to the edges of the main body, and two cord-engaging projections below the cord-support, separate therefrom and within vertical lines from the outer edges of the cord-support, for the purposes described.

6. The herein-described picture-hanger, consisting of a plate provided with means for engaging a support for the same, a support for the picture-cord having its lateral edges extending nearly or quite to the edges of said plate, the said plate having below the said cord-support a centrally-depending portion of less width than the cord-support, said depending portion being provided with two projections for removably engaging the cord below the cord-support, for the purposes specified.

7. The herein-described picture-hanger, consisting of a main body provided with means for engaging a support for the same tending to hold it from lateral vibration upon said support, a cord-support, and a projection or projections in a different horizontal plane from the cord-support for holding the cord in an inwardly-deflected position and from slipping on its support, said projection or projections being concaved or inclined between the outer end and the main body, forming notches or recesses parallel with the main body for receiving the cord, whereby the picture can be suspended upon the cord-support and while so suspended adjusted to its proper position without the cord's bearing on the operative surfaces of said projection or projections, and the cord then removably engaged with the said projection or projections, as and for the purposes set forth.

8. The herein-described picture-hanger, consisting of a main body provided with a broad-bearing cornice-hook, a cord-support, and a projection or projections in a different horizontal plane from the cord-support for holding the cord in an inward-deflected position and from slipping on its supports, said projection or projections being concaved or reduced laterally, forming notches or recesses parallel with the main body of the hanger for receiving the cord, whereby the picture can be suspended upon the cord-support, and while the weight is upon the cord and its support the picture can be adjusted to its proper position and the cord then be removably secured by the projection or projections by inwardly deflecting and engaging the same therewith, as and for the purposes specified.

In testimony whereof I affix my signature in presence of two witnesses.

WARREN M. BRINKERHOFF.

Witnesses:
E. T. WALKER,
JULIUS SOLGER.